(12) United States Patent
Chaiko

(10) Patent No.: US 7,160,942 B2
(45) Date of Patent: *Jan. 9, 2007

(54) POLYMER-PHYLLOSILICATE NANOCOMPOSITES AND THEIR PREPARATION

(75) Inventor: David J. Chaiko, Naperville, IL (US)

(73) Assignee: UChicago Argonne, LLC, Chicago, IL (US)

(*) Notice: Subject to any disclaimer, the term of this patent is extended or adjusted under 35 U.S.C. 154(b) by 363 days.

This patent is subject to a terminal disclaimer.

(21) Appl. No.: 10/609,907

(22) Filed: Jun. 30, 2003

(65) Prior Publication Data

US 2004/0214921 A1   Oct. 28, 2004

Related U.S. Application Data

(60) Provisional application No. 60/395,258, filed on Jul. 12, 2002.

(51) Int. Cl.
 *C08K 5/34* (2006.01)

(52) U.S. Cl. ............... 524/445; 524/186; 524/377; 524/446; 524/447; 524/449; 524/488; 524/497; 501/148

(58) Field of Classification Search ............... 524/377, 524/445, 186, 446, 447, 449, 488, 497; 501/148
See application file for complete search history.

(56) References Cited

U.S. PATENT DOCUMENTS

| | | | |
|---|---|---|---|
| 4,235,751 A | 11/1980 | Del Pesco | |
| 4,412,018 A | 10/1983 | Finlayson et al. | |
| 4,434,075 A | 2/1984 | Mardis et al. | |
| 4,435,217 A | 3/1984 | House | |
| 4,517,112 A | 5/1985 | Mardis et al. | |
| 4,810,734 A | 3/1989 | Kawasumi et al. | |
| 4,816,517 A | 3/1989 | Wilkus et al. | |
| 5,552,469 A | 9/1996 | Beall et al. | |
| 5,554,670 A | 9/1996 | Giannelis et al. | |
| 5,582,638 A | 12/1996 | Coutelle et al. | |
| 5,645,758 A | 7/1997 | Kawasumi et al. | |
| 5,698,624 A | 12/1997 | Beall et al. | |
| 5,726,247 A | 3/1998 | Michalczyk et al. | |
| 5,747,560 A | 5/1998 | Christiani et al. | |
| 5,840,796 A | 11/1998 | Badesha et al. | |
| 5,876,812 A | 3/1999 | Frisk et al. | |
| 5,910,523 A | 6/1999 | Hudson | |
| 5,962,553 A | 10/1999 | Ellsworth | |
| 6,034,163 A | 3/2000 | Barbee et al. | |
| 6,036,765 A | 3/2000 | Farrow et al. | |
| 6,043,300 A | 3/2000 | Santhanam | |
| 6,060,549 A | 5/2000 | Li et al. | |
| 6,084,019 A | 7/2000 | Matayabas, Jr. et al. | |
| 6,103,817 A | 8/2000 | Usuki et al. | |
| 6,136,908 A | 10/2000 | Liao et al. | |
| 6,156,835 A | 12/2000 | Anderson et al. | |
| 6,172,121 B1 | 1/2001 | Chaiko | |
| 6,225,374 B1 | 5/2001 | Vaia et al. | |
| 6,262,162 B1 | 7/2001 | Lan et al. | |
| 6,271,297 B1 | 8/2001 | Ishida | |
| 6,271,298 B1 | 8/2001 | Powell | |
| 6,632,868 B1 | 10/2003 | Qian et al. | |
| 6,759,463 B1 | 7/2004 | Lorah et al. | |
| 6,790,896 B1 | 9/2004 | Chaiko | |
| 6,822,035 B1 | 11/2004 | Chaiko | |
| 6,841,226 B1 | 1/2005 | Dontula et al. | |
| 6,864,308 B1 | 3/2005 | Rosenthal et al. | |

OTHER PUBLICATIONS

Beall, G. W. et al., "Chapter 15: Nanocomposites Produced Utilizing a Novel Ion-Dipole Clay Surface Modification," *Chemistry and Technology of Polymer Additives*, Al-Malaika, Golovoy, Wilkie (eds.), Aug. 1, 1999, pp. 266-280; published by Blackwell Science Ltd.

*Primary Examiner*—Kriellion Sanders
(74) *Attorney, Agent, or Firm*—Foley & Lardner LLP

(57) ABSTRACT

Polymer-phyllosilicate nanocomposites that exhibit superior properties compared to the polymer alone, and methods-for producing these polymer-phyllosilicate nanocomposites, are provided. Polymeric surfactant compatabilizers are adsorbed onto the surface of hydrophilic or natural phyllosilicates to facilitate the dispersal and exfoliation of the phyllosilicate in a polymer matrix. Utilizing polymeric glycol based surfactants, polymeric dicarboxylic acids, polymeric diammonium surfactants, and polymeric diamine surfactants as compatabilizers facilitates natural phyllosilicate and hydrophilic organoclay dispersal in a polymer matrix to produce nanocomposites.

36 Claims, No Drawings

POLYMER-PHYLLOSILICATE NANOCOMPOSITES AND THEIR PREPARATION

RELATED APPLICATIONS

This Application claims priority to U.S. Provisional Application No. 60/395,258, filed Jul. 12, 2002, and herein incorporated by reference in its entirety for all purposes.

STATEMENT REGARDING FEDERALLY SPONSORED RESEARCH

The United States Government has rights in this invention pursuant to Contract No. W-31-109-ENG-38 between the United States Department of Energy and the University of Chicago representing Argonne National Laboratory.

FIELD OF THE INVENTION

This invention relates to polymer-phyllosilicate nanocomposites. More particularly, this invention relates to nanoparticles of natural or hydrophilic phyllosilicates substantially uniformly dispersed in a variety of polymers including the polyolefins, thermoset and thermoplastic polyesters, and phenolics.

BACKGROUND OF THE INVENTION

Using bulk phyllosilicates and clays as fillers in industrial products, including plastics and paper products, is well known. Typically, phyllosilicates and clays have been used in materials as fillers because the cost of the bulk phyllosilicate or clay is much less than the material to which the phyllosilicate is added. Conventional techniques and equipment allow phyllosilicates to be dispersed in roughly micrometer sized particles throughout a substance. Although using bulk phyllosilicates as fillers has decreased the cost of many finished products, the use of phyllosilicates in these products has, at times, had a detrimental effect on the physical characteristics of the completed product, including excessive weight gain and decreased physical strength.

There has been a great deal of interest in the last five years to incorporate fully exfoliated smectite clays, primarily montmorillonite with its extremely high aspect ratio, into a variety of polymers, particularly nylon, polyolefins and polyethyleneterephthalate (PET). The approach taken by most research groups is based on the technology utilized for the last forty years to make organoclays as rheological control agents in paints, inks, greases, and the like. This approach utilizes quaternary amine-based surfactants to render the surface of the clay compatible with the polymer matrix. The concept being that the clay surface is very hydrophilic and the quaternary amines render the surface hydrophobic and thus, more compatible with the polymers which themselves are very hydrophobic. This approach, however, has not been very successful in fully dispersing the clay platelets through exfoliation throughout the polymer matrix. Another problem with this class of surfactants is that the amines tend to decompose around or below the temperatures needed to extrude these polymers. Thus, polymer nanocomposites have proven difficult to manufacture. Other attempts to overcome this inherent incompatibility between the phyllosilicate and the polymer include chemically treating the phyllosilicate to make the phyllosilicate more polymer compatible. Such treatment is followed by melt compounding and intercalation of the clay with monomers which are then polymerized into the polymer matrix through condensation or free radical polymerization. However, these processes are costly, time consuming, and have only been successful for combining a limited range of clays with specific polymers.

Current technology, based on ammonium ion surfactants, has been surprisingly unsuccessful at incorporating phyllosilicates into polymers to produce nanocompositions. Organophyllosilicates tend to be either completely hydrophilic or completely hydrophobic with no ability to shift their surface wetting characteristics in situ. A shift from hydrophilic to hydrophobic surface wetting is an especially valuable characteristic in the production of films using water-based compositions which impart water and chemical resistance to the substrate when dry. In addition, the onium ion surfactants that have been used extensively in the past to make organophyllosilicates rely on the ion exchange reaction of a single functional group in the surfactant molecule. This means that the individual surfactant molecules are relatively weakly attached to the clay surface and can be stripped off in the high temperature/high shear environment of the extruders and mixers that have been used in blending and exfoliating the organoclays with the polymer melt.

Thus there is a need for more robust surface treatment technology to enable dispersion of natural phyllosilicates and hydrophilic organophyllosilicates into various polymer systems to form nanocomposites.

SUMMARY OF THE INVENTION

The present invention provides a polymer-phyllosilicate nanocomposite comprising a polymer, a hydrophilic organophyllosilicate or a natural phyllosilicate having a surface, and a compatabilizer associated with the surface of the phyllosilicate. The phyllosilicate of the present invention, and correspondingly the associated compatabilizer, is substantially homogeneously dispersed throughout the polymer as nanometer-sized particles. In various embodiments, the polymer may be a polyolefin, a phenolic resin, or a polyester.

The present invention also provides a method for producing polymer-phyllosilicate nanocomposites comprising adsorbing a polymeric surfactant onto a surface of a natural phyllosilicate or a phyllosilicate that has had its surface modified with an organic surfactant to make the phyllosilicate hydrophilic and substantially homogeneously dispersing the phyllosilicate and polymeric surfactant adsorbed thereon as nanometer sized particles throughout a polymer to form a nanocomposite. Additionally, the method of the present invention can include matching the hydrophilic/lipophilic balance (HLB) value of the polymeric surfactant with the solubility parameter of the polyolefin to provide superior dispersability of the phyllosilicate on the polyolefin.

Preferred species of polyolefins include thermoplastic polyolefins, polyethylene and polypropylene and their various copolymers, thermoplastic and thermoset polyesters, and phenolics. Preferred compatabilizers include polyethylene glycol and polypropylene glycol based surfactants such as polyethylene glycol n-alkyl ethers. Polymeric difunctional carboxylic acids along with polymeric difunctional ammonium surfactants, are also suitable compatabilizers, especially when hydrophilic organophyllosilicates are utilized. Phyllosilicates useful in the present invention include the ion exchangeable phyllosilicates such as the smectite clays and micas, and combinations thereof. The smectite clay can be naturally occurring, such as montmorillinite, hectorite, saponite, beidelite, stevensite, and nontronite, or synthetic, such as Laponite®, or combinations of natural and synthetics. Natural and synthetic talcs may also be used.

The above described embodiments are set forth in more detail in the following description described hereinbelow.

DETAILED DESCRIPTION OF THE INVENTION

This invention is based on the use of polymeric surfactant compatabilizers in association with hydrophilic organophyllosilicates and natural, untreated phyllosilicates and clays to facilitate their dispersion in various polymers. As will be well understood by one skilled in the art, the phyllosilicates discussed herein inherently have basal surfaces and are arranged in layers of particles which are stacked on top of one another. The stacking of the clay particles provides interlayers, or galleries, between the phyllosilicate layers. These galleries are normally occupied by cations, typically comprising sodium, potassium, calcium, magnesium ions and combinations thereof, that balance the charge deficiency generated by the isomorphous substitution within the clay layers. Typically, water is also present in the galleries and tends to associate with the cations. The distance between the basal surfaces of adjacent phyllosilicate layers is referred to as the basal spacing. Hydrophilic organophyllosilicates are phyllosilicates, e.g., clays, which have had their basal surfaces modified with organic surfactants so that the clay is more easily dispersed through exfoliation of the individual clay platelets in water-based mixtures. A natural phyllosilicate refers to a phyllosilicate in its native, unmodified state. Thus natural phyllosilicates are phyllosilicates which have not had their hydrophilic/lipophilic balance (HLB) artificially altered with surfactants, such as those used to produce organoclays.

Compatabilizers are polymeric surfactants which facilitate the dispersion and exfoliation of the phyllosilicate within a polymer, e.g. polyolefin, matrix. Compatabilizers which can be suitably used according to the present invention include, but are not limited to, glycol based surfactants, such as polyethylene glycol n-alkyl ethers, polymeric dicarboxylic acids, polymeric diammonium surfactants, and polymeric diamine surfactants. One example of a polyethylene glycol n-alkyl ether for use in preferred embodiments of the present invention is tetraethylene glycol n-dodecyl ether. When hydrophilic organophyllosilicates are used in phyllosilicate/polymer compositions according to the present invention, difunctional carboxylic acids such as terephthalic acid and the Westvaco DIACID® derivatives of tall oil are particularly preferred compatabilizers. In addition, the difunctional polymeric amines such as polypropylene glycol diamine can also serve as compatabilizers.

Although any phyllosilicate is suitable for use in the present invention, preferred phyllosilicates are the smectite clay minerals such as montmorillonite, hectorite, saponite, beidellite, stevensite, and nontronite. Also included are synthetic smectite clays such as the commercially available Laponite®. Natural and synthetic talcs are also useful in the nanocomposites produced according to the present invention.

A polyolefin-clay nanocomposite according to the present invention is prepared by first adsorbing a polymeric surfactant compatibilizer onto the clay surface, thereby producing a clay with the polymeric surfactant intercalated into the clay galleries. The polymeric surfactant or compatabilizer facilitates the dispersion and exfoliation of the clay within the polyolefin matrix. The polymeric surfactant is associated with the surface of the phyllosilicate and can be adsorbed onto the phyllosilicate through direct melt intercalation or, alternatively, from an aqueous dispersion of the clay and surfactant. The surfactant can be attached to the basal surface of the phyllosilicate through oxonium ion exchange or through solvation of the counter ions, via ion-dipole interactions, at the basal surface by the polar functionality of the surfactant.

The use of polymeric surfactants to render the surface of the phyllosilicate compatible with the polyolefin matrix is uniquely different from previous attempts at the preparation of polyolefin clay hybrids which utilized quaternary amine-based surfactants (e.g., dimethyl ditallow ammonium chloride). In fact, quaternary amines have been used almost exclusively in the prior art to render the surfaces of clays organophilic. The prior art produces organophilic clays that, at least structurally, bear resemblance to lamellar liquid crystals (LLC) found in oil/water/surfactant systems. When an organic solvent is intercalated within the galleries of the organoclay, the alkyl chains lift off from the clay surface producing a liquid crystal structure which is the analogue of the LLC phases in which the clay platelet takes the place of the water layer in the oil/water/surfactant system. While organoclays will spontaneously swell in the presence of a suitable organic solvent, the organoclays will not spontaneously disperse into an excess of the organic solvent. In this regard the organoclays bear further resemblance to the LLC phases of oil/water/surfactant systems. It is well known from the surfactant literature that LLC's have a limited capacity to solubilize organics through intercalation within the hydrocarbon region of the LLC. Even in swollen LLC phases, where the hydrocarbon chains of the surfactant adopt a fully extended conformation, the terminal groups of the surfactant chains in adjacent surfactant monolayers remain in contact. This is due to entropic effects wherein the surfactant chains exhibit an order parameter that is intermediate between that of a liquid and a solid. Hence, the LLC is not compatible with a bulk liquid hydrocarbon phase. These same entropic effects are observed in clay/polymer nanocomposite systems and prevent the unlimited swelling and exfoliation of organoclays in polymer systems thereby making it difficult to achieve the full exfoliation of a clay in a polymer matrix.

Unlike the typical surfactants used in preparing traditional organophilic clays, such as the quaternary amines, the non-ionic surfactant compatabilizers described herein are able to solubilize exceptionally large quantities of hydrocarbons within the LLC phase. In fact, the solubilization is sufficient to produce a discrete oil layer between the hydrocarbon region of the lamellar structure. Surfactants of this type can be used to render the surfaces of phyllosilicates hydrophobic and thereby facilitate their dispersion as nanometer-sized particulates within hydrophobic polymeric matrices (e.g., polyolefins). For example, polyethylene glycol based and polypropylene glycol based surfactants containing polyethylene or polypropylene hydrocarbon chains can be used to disperse phyllosilicates in polyethylene or polypropylene, respectively. Glycol-based surfactants may be any surfactants having a glycol-based head group (e.g., a polyethylene glycol head group) and a non-polar chain group, such as an n-alkyl ether chain.

The optimum hydrocarbon chain length of the surfactant is determined by the solubility parameter of the polyolefin. This is done by matching the solubility parameter of the surfactant, which is correlated to the surfactant's hydrophile/lipophile balance (HLB) value, with the solubility parameter of the polymer. The HLB values of surfactants and the solubility parameters of polymers are published in reference texts such as the CRC Handbook of Solubility Parameters and Other Cohesion Parameters, Allan F. M. Barton, CRC Press Inc., Boca Raton, Fla. (1983). Thus, a surfactant containing a tetraethylene glycol polar group and a 24-carbon n-alkyl chain (i.e., $C_{24}E_4$) would have an HLB value of 4.0 which correlates with a solubility parameter of approximately 17 $MPa^{1/2}$. This solubility parameter is similar to that of polyethylene which ranges from 16.6 to 17.5 $MPa^{1/2}$ and ensures that the surfactant is compatible with polyethylene. The solubility parameter of polypropylene is approximately 17.3 $MPa^{1/2}$ and the optimum surfactant (with a polypropylene chain) would have an HLB value of approximately 3 to 4. Although the solubility parameter of the polymeric surfactant and the solubility parameter of the polymer can vary by any degree, preferably they are comparable in degree and in some embodiments differ by no more than 6 $MPa^{1/2}$. In a more preferred embodiment, the two solubility parameters differ by no more than 2–3 $MPa^{1/2}$, and in a more preferred embodiment, 1 or 2 $MPa^{1/2}$.

Incorporating nanometer sized particles into polyolefins according to the present invention results in nanocomposite polymers which exhibit greatly improved physical properties over either the polymer alone or polymers filled with bulk phyllosilicates. For example, the nanocomposite polyolefins of the present invention are expected to have any or all of increased stiffness, higher heat deflection temperatures, reduced shrinkage, decreased permeability to liquids and gases, fire resistance and increased resistance to solvents while at the same time maintaining densities comparable to the polyolefin polymers alone. Water-based nanocomposites which have a high clay to polymer ratio are especially useful as flame retardant materials that can be applied to the surfaces of paper, polymer films or fibers. Hydrophilic organophyllosilicates can be incorporated into polyesters and phenolics to improve barrier properties and flame resistance. Enhancement of the physical properties of the polyolefin polymer can be achieved when the nanocomposites of the present invention have low percentages of exfoliated phyllosilicate platelets, for example less than 6% phyllosilicate. Useful ranges of phyllosilicate loading are from approximately 0.01 weight percent (wt. %) to approximately 60 wt. %.

These superior physical characteristics are widely believed to result from the extremely high aspect ratios which exfoliated platelets of phyllosilicates inherently possess. The aspect ratio of a phyllosilicate is the ratio of a phyllosilicate's length compared to its thickness. Typical phyllosilicate platelets have a thickness in the range of 10 Å, whereas the average length ranges from 50 to 2,000 Å depending upon the phyllosilicate used. Preferably, phyllosilicates used in the present invention have higher aspect ratios. However, lower aspect ratio phyllosilicates, such as Laponite®, can also be used. The aspect ratio of individual phyllosilicate platelets ranges from about 5 to about 2000. Montmorillinite, a preferred phyllosilicate used in the present invention has an aspect ratio of about 1000. Because the individual platelets of phyllosilicates have a thickness in the nanometer range, composites of these platelets dispersed in-other materials are referred to as nanocomposites. As the phyllosilicate platelets dispersed throughout the polyolefin matrix are typically smaller than the wavelength of visible light, the optical characteristics of the polyolefin nanocomposites are almost completely unaffected. However, nanocomposites may provide superior ultraviolet protection and improved resistance to the degradative effects of ultraviolet radiation because the individual phyllosilicate platelets are the appropriate size to scatter and absorb the shorter wavelength ultraviolet radiation.

Due to their improved physical characteristics, the polymer nanocomposites of the present invention are suitable for use in a vast array of commercial products, particularly where these polymers are already in use. These products include packaging materials, car body panels, car interior panels, thin films and the like. In certain applications, such as in thin polyolefin films, the material can be handled to orient all of the phyllosilicate platelets in the same direction. This can be achieved in polyolefin films by stretching the films either monoaxially or biaxially by methods well known in the art. For example, monoaxial stretching of the film can be accomplished by using tension to run the film over a series of rollers wherein late rollers have higher speeds than the earlier reached rollers. Biaxial stretching is achieved by pulling on the edges of the film away from each other. Polymer nanocomposites according to the present invention can also contain other additives which do not interfere with the beneficial properties of the nanocomposites. Such additives include, but are not limited to plasticizers, lubricants, flame retardants, colorants, antistatic agents, and antioxidants. Such additives are well known and may be found for example in the "Encyclopedia of Polymer Science and Engineering," John Wiley & Sons, NY (1985), hereby incorporated by reference in its entirety.

Although most desirably the phyllosilicates of the present invention are completely exfoliated, wherein individual phyllosilicate platelets are dispersed evenly throughout the polymer matrix, and no agglomeration of the phyllosilicate platelets exists, superior results are also achieved with nanocomposites where the phyllosilicate is substantially homogeneously dispersed throughout the polyolefin polymer. Although the phrase "substantially homogeneously dispersed" as used in the present invention is not capable of an exact definition, a person skilled in the art will understand that all dispersions of phyllosilicate platelets which exhibit nanocomposite properties and not merely bulk properties achieved by micron sized dispersions of phyllosilicates are within the scope of the present invention. For example, multiple phyllosilicate platelets having aspect ratios on the high end of the scale can aggregate together and still provide a relatively high aspect ratio for the agglomerated platelets. Accordingly, higher aspect ratio phyllosilicate platelets support higher rates of agglomeration while still being useful in the present invention.

Preferred embodiments of the present invention are further detailed in the following non-limiting examples.

EXAMPLES

Example 1

The surface of a saponite was modified by adsorption of tetraethylene glycol polar group having a 24-carbon n-alkyl chain by direct melt intercalation at 120° C. The saponite had previously been purified by the pseudophasic extraction process according to U.S. Pat. No. 6,383,282 and spray dried to a residual moisture level of approximately 2 wt %. The intercalate, which contained 17.5 wt % clay, 7.5 wt % polyethylene glycol, and 75 wt % of a tetraethylene glycol polar group with a 24-carbon n-alkyl chain was dispersed in low density polyethylene giving a composite containing 6.4 wt % clay and 64 wt % polyethylene. Pressing the mixture at 120° C. produced a clear and colorless film.

Example 2

A commercially purified montmorillonite, Cloisite Na from Southern clay Products, was dispersed in deionized water and the edge of the clay was treated with the ammonium salt of 1-hydroxybutyl-1,1-diphosphonic acid at a concentration of 4.5 weight percent, relative to the dry weight of the clay. After mixing for 5 minutes, the basal surface of the clay was treated with polyethylene glycol 1500 at a concentration of 27 weight percent, relative to the dry weight of the clay. The dispersion was stirred for 30 minutes and the ammonium salt of terephthalic acid was added to the dispersion at a mole ratio of approximately 7 moles terephthalic acid per mole polyethylene glycol. The dispersion can be dried to produce a hydrophobic film for improving the water resistance of paper products and for improving the flame resistance of paper and polymer products such as woven and nonwoven fabrics. Alternatively, the organoclay can be flocculated from the aqueous dispersion by reducing the pH of the slurry to between 3–7 so that the ammonium terephthalate is converted to the free acid which hydrogen bonds to the ether linkage of the polyethylene glycol thereby rendering the surface hydrophobic. The solids can be washed to remove residual salts and dried to remove residual water. The resulting hydrophobic organoclay can be dispersed in PET by mixing with the polymer melt to produce a nanocomposite. In the absence of oxygen the organoclay is expected to be stable to over 300° C. The exceptionally high thermal stability is significantly higher than traditional quaternary amine treated organoclays and thereby overcomes one of the main problems with conventional organoclay chemistry.

Example 3

A Wyoming bentonite ore was purified using the pseudophasic extraction process to give a purified clay slurry containing approximately 2 weight percent clay and containing approximately 27 weight percent polyethylene glycol 1500, relative to the weight of the clay, and approximately 2 weight percent polypropylene glycol 1000, relative to the weight of the clay. The product slurry was diluted with deionized water to a total solids concentration of approximately 1 weight percent solids and reacted with polypropylene glycol bis(2-aminopropyl ether), molecular weight of 2000. The pH of the slurry was reduced to between 5 and 7 with the addition of hydrochloric acid. The resulting hydrophobic organoclay was filtered, washed with deionized water and dried. The x-ray diffraction pattern of the organoclay showed that the organoclay had a d(001) spacing of approximately 50 Å. This material was dispersible in polypropylene.

The present methods or compositions can involve any or all of the steps, conditions or components discussed above in various combinations, as desired. Accordingly, it will be readily apparent to the skilled artisan that in some of the disclosed methods and compositions certain steps or components can be deleted or additional steps performed or components added without affecting the viability of the methods or compositions.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

All references disclosed herein are specifically incorporated by reference thereto.

While preferred embodiments have been illustrated and described, it should be understood that changes and modifications can be made therein in accordance with ordinary skill in the art without departing from the invention in its broader aspects as defined in the following claims.

What is claimed is:

1. A polymer-phyllosilicate composition comprising:
   (a) a polymer;
   (b) a phyllosilicate selected from the group consisting of hydrophilic organophyllosilicates and natural phyllosilicates, wherein the phyllosilicate has a surface; and
   (c) a polymeric surfactant associated with the surface of the phyllosilicate;
   wherein the phyllosilicate is substantially homogeneously dispersed throughout the polyolefin as nanosized particles.

2. The composition of claim 1 wherein the polymer is selected from the group consisting of polyolefins, polyesters, and phenolic resins.

3. The composition of claim 1 wherein the polymer is a polyolefin selected from the group consisting of polypropylene and polyethylene.

4. The composition of claim 1 wherein the polymeric surfactant is selected from the group consisting of polymeric glycol based surfactants, polymeric dicarboxylic acid surfactants, polymeric diammonium surfactants and polymeric diamine surfactants.

5. The composition of claim 1 wherein the polymeric surfactant is selected from the group consisting of polyethylene glycol based and polypropylene glycol based surfactants.

6. The composition of claim 1 wherein the polymeric surfactant comprises a glycol based head group and an n-alkyl ether chain.

7. The composition of claim 1 wherein the polymeric surfactant is a polyethylene glycol n-alkyl ether.

8. The composition of claim 1 wherein the solubility parameter of the polymeric surfactant and the solubility parameter of the polymer differ by no more than 6 MPa½.

9. The composition of claim 1 wherein the solubility parameter of the polymeric surfactant and the solubility parameter of the polymer differ by no more than 2–3 MPa½.

10. The composition of claim 1 wherein the solubility parameter of the polymeric surfactant and the solubility parameter of the polymer differ by no more than 1 or 2 MPa½.

11. The composition of claim 1 wherein the phyllosilicate is selected from the group consisting of natural smectite clays, synthetic smectite clays, kaolinite clays, mica, natural talcs, synthetic talcs, and combinations thereof.

12. The composition of claim 11 wherein the smectite clay is selected from the group consisting of montmorillonite, hectorite, saponite, beidellite, stevensite, nontronite, laponite, and combinations thereof.

13. A polymer-phyllosilicate composition consisting essentially of:
(a) a polymer;
(b) a phyllosilicate selected from the group consisting of hydrophilic organophyllosilicates and natural phyllosilicates, wherein the phyllosilicate has a surface; and
(c) a polymeric surfactant associated with the surface of the phyllosilicate
wherein the phyllosilicate is substantially homogenously dispersed throughout the polyolefin as nanosized particles.

14. The composition of claim 13 wherein the polymer is selected from the group consisting of polyolefins, polyesters, and phenolic resins.

15. The composition of claim 13 wherein the polymer is a polyolefin selected from the group consisting of polypropylene and polyethylene.

16. The composition of claim 13 wherein the polymeric surfactant is selected from the group consisting of polymeric glycol based surfactants, polymeric dicarboxylic acid surfactants, polymeric diammonium surfactants and polymeric diamine surfactants.

17. The composition of claim 13 wherein the polymeric surfactant is selected from the group consisting of polyethylene glycol based and polypropylene glycol based surfactants.

18. The composition of claim 13 wherein the polymeric surfactant comprises a glycol based head group and an n-alkyl ether chain.

19. The composition of claim 13 wherein the polymeric surfactant is a polyethylene glycol n-alkyl ether.

20. The composition of claim 13 wherein the solubility parameter of the polymeric surfactant and the solubility parameter of the polymer differ by no more than 6 MPa½.

21. The composition of claim 13 wherein the solubility parameter of the polymeric surfactant and the solubility parameter of the polymer differ by no more than 2–3 MPa½.

22. The composition of claim 13 wherein the solubility parameter of the polymeric surfactant and the solubility parameter of the polymer differ by no more than 1 or 2 MPa½.

23. The composition of claim 13 wherein the phyllosilicate is selected from the group consisting of natural smectite clays, synthetic smectite clays, kaolinite clays, mica, natural talc, synthetic talc, and combinations thereof.

24. The composition of claim 23 wherein the smectite clay is selected from the group consisting of montmorillonite, hectorite, saponite, beidellite, stevensite, nontronite, laponite, and combinations thereof.

25. A method for manufacturing a polymer-phyllosilicate nanocomposition comprising:
(a) adsorbing a polymeric surfactant onto a surface of a phyllosilicate, wherein the phyllosilicate is selected from the group consisting of natural phyllosilicates and hydrophilic organophyllosilicates; and
(b) substantially homogeneously dispersing the phyllosilicate and the polymeric surfactant adsorbed on the surface thereof as nanosized particles throughout a polymer to form a polymer-phyllosilicate nanocomposite.

26. The method of claim 25 wherein the solubility parameter of the polymer differs from the solubility parameter of the polymeric surfactant by no more than 6 MPa½.

27. The method of claim 25 wherein the solubility parameter of the polymeric surfactant and the solubility parameter of the polymer differ by no more than 2–3 MPa½.

28. The method of claim 25 wherein the solubility parameter of the polymeric surfactant and the solubility parameter of the polymer differ by no more than 1 or 2 MPa½.

29. The method of claim 25 wherein the polymer is selected from the group consisting of polyolefins, polyesters, and phenolic resins.

30. The method of claim 25 wherein the polymer is a polyolefin selected from the group consisting of polypropylene and polyethylene.

31. The method of claim 25 wherein the polymeric surfactant is selected from the group consisting of polymeric glycol based surfactants, polymeric dicarboxylic acid surfactants, polymeric diammonium surfactants and polymeric diamine surfactants.

32. The method of claim 25 wherein the polymeric surfactant is selected from the group consisting of polyethylene glycol based and polypropylene glycol based surfactants.

33. The method of claim 25 wherein the polymeric surfactant comprises a glycol based head group and an n-alkyl ether chain.

34. The method of claim 25 wherein the polymeric surfactant is a polyethylene glycol n-alkyl ether.

35. The method of claim 25 wherein the phyllosilicate is selected from the group consisting of natural smectite clays, synthetic smectite clays, kaolinite clays, mica, natural talcs, synthetic talc, and combinations thereof.

36. The method of claim 35 wherein the smectite clay is selected from the group consisting of montmorillonite, hectorite, saponite, beidellite, stevensite, nontronite, laponite, and combinations thereof.

* * * * *

UNITED STATES PATENT AND TRADEMARK OFFICE
CERTIFICATE OF CORRECTION

PATENT NO. : 7,160,942 B2 Page 1 of 1
APPLICATION NO. : 10/609907
DATED : January 9, 2007
INVENTOR(S) : David J. Chaiko It is certified that error appears in the above-identified patent and that said Letters Patent is hereby corrected as shown below:

OTHER PUBLICATIONS

Title Page, item No.

Please add the following non-patent references:

-- Kawasumi, M. *et al.*, "Preparation and Mechanical Properties of Polypropylene-Clay Hybrids," *Macromolecules*, 30, pp. 6333-6338, October 6, 1997; published by American Chemical Society.--

-- Hasegawa, N. *et al.*, "Preparation and Mechanical Properties of Polypropylene-Clay Hybrids Using a Maleic Anhydride-Modified Polypropylene Oligomer," *J. Appl. Polym, Sci.*, 67, pp. 87-92, January 3, 1998; published by John Wiley & Sons, Inc.--

Signed and Sealed this

Twenty-seventh Day of March, 2007

JON W. DUDAS
*Director of the United States Patent and Trademark Office*